United States Patent [19]

Kranz et al.

[11] Patent Number: 5,139,305

[45] Date of Patent: Aug. 18, 1992

[54] CONFIGURATION FOR RETAINING A WINDOW GUIDE PROFILE SECTION

[75] Inventors: Jürgen Kranz; Gerd-Lutz Seegert, both of Lindau, Fed. Rep. of Germany

[73] Assignee: Metzeler Automotive Profiles GmbH, Lindau, Fed. Rep. of Germany

[21] Appl. No.: 709,647

[22] Filed: Jun. 3, 1991

[30] Foreign Application Priority Data

Jun. 1, 1990 [DE] Fed. Rep. of Germany ....... 4017813

[51] Int. Cl.$^5$ .................. B60J 10/08; B60J 10/02; E06B 7/16
[52] U.S. Cl. .................. 296/146 F; 296/201; 296/202; 296/146 K; 49/440
[58] Field of Search .............. 296/201, 202, 146; 49/440, 441, 488, 484, 491, 496

[56] References Cited

U.S. PATENT DOCUMENTS

| | | | |
|---|---|---|---|
| 4,656,784 | 4/1987 | Brachmann | 49/441 |
| 4,783,931 | 11/1988 | Kirkwood | 49/441 |
| 4,937,126 | 6/1990 | Jackson | 49/490 |
| 4,951,418 | 8/1990 | Keys | 49/440 |
| 5,038,521 | 8/1991 | Andrzejewski et al. | 49/441 |

*Primary Examiner*—Robert R. Song
*Attorney, Agent, or Firm*—Herbert L. Lerner; Laurence A. Greenberg

[57] ABSTRACT

An assembly of a motor vehicle having a roof, a door, and a window pane includes a box-like frame of the door, and a window guide profile section to be retained on the door frame. The door frame has a top with a longitudinally extending gap formed therein. The window guide profile section has a sealing lip, an inner surface with a rib-like projection thereon, and a U-shaped cross section. The window guide profile section is slipped onto the door frame with the sealing lip protruding laterally toward the window pane and laterally toward the roof, and the projection snapping into the gap.

8 Claims, 1 Drawing Sheet

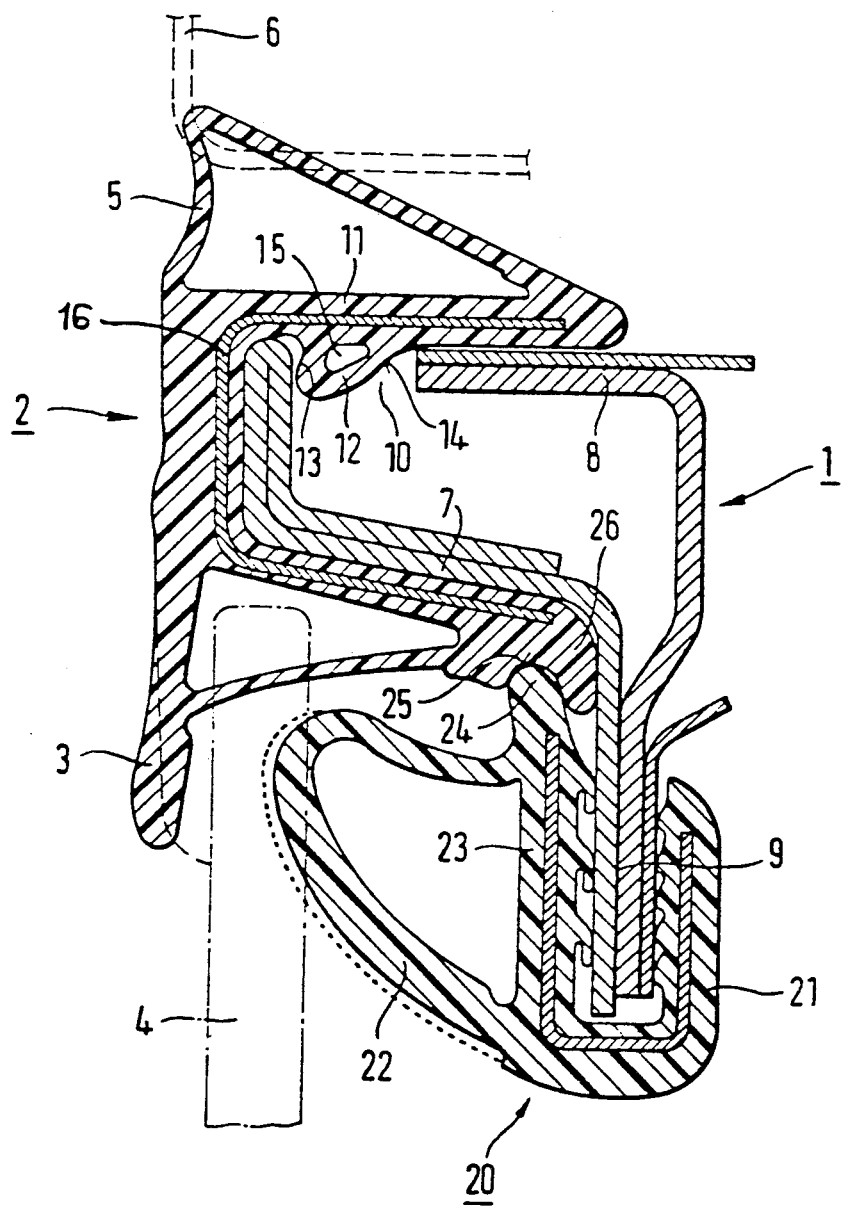

CONFIGURATION FOR RETAINING A WINDOW GUIDE PROFILE SECTION

The invention relates to a configuration for retaining a window guide profile section on a door frame of a motor vehicle, in which the door guide profile section is constructed with a U-shaped cross section and is slipped onto the box-like frame of the door with a sealing lip protruding laterally toward the window pane and laterally toward the vehicle roof.

Such a window guide profile section and appropriate retaining means therefor are known, for instance, from Published European Patent Application No. 0 182 381. The frame which encloses a window opening in the vehicle door has two ribs protruding outward, onto which the suitably shaped window guide profile section is slipped.

However, such a fastening entails difficulties, Particularly if either the profile section to be mounted or the door frame, or both, exhibit relatively large tolerances, so that the window guide profile section is only inadequately fixed, or does not precisely assume the prescribed position with respect to the window pane and/or the door frame. Moreover, the profile section must be slipped onto the door frame with very accurate positioning, so that the applicable parts will mesh with one another in accurate positions.

In contrast thereto, it is an object of the invention to provide a configuration for retaining a window guide profile section, which overcomes the hereinafore-mentioned disadvantages of the heretofore-known devices of this general type and with which such a window guide profile section can be mounted quickly and easily, without requiring accurate centering beforehand, while at the same time making it possible to compensate for relatively large tolerances.

With the foregoing and other objects in view there is provided, in accordance with the invention, in a motor vehicle having a roof, a door, and a window pane, an assembly comprising a box-like frame of the door, and a window guide profile section to be retained on the door frame, the door frame having a top with a longitudinally extending gap formed therein, and the window guide profile section having a sealing lip, an inner surface with a rib-like projection thereon, and a U-shaped cross section, the window guide profile section being slipped onto the door frame with the sealing lip protruding laterally toward the window pane and laterally toward the roof or roof sleeper, and the projection snapping into the gap, after the profile section has been slipped on.

The profile section enclosing the door frame on its outside can be simply slipped on without accurate centering and it fixes itself in place, because on one hand the profile section is positioned precisely in its position by the rib snapping into place, and on the other hand the profile section cannot slip out again by itself.

In accordance with another feature of the invention, the projection has a vertical lateral surface facing toward the outside of the door for better fixation, and an obliquely inclined lateral surface facing toward the inside of the door for more easily slipping on the window guide profile section.

In accordance with a further feature of the invention, for the sake of exact fixation on the frame, the gap is only slightly wider than the width of the base of the rib-like projection.

In accordance with an added feature of the invention, the rib-like projection has a hollow chamber, to enable easier compression as the profile section is being slipped on.

In accordance with an additional feature of the invention, the U-shaped profile has a metal reinforcement, in order to make it more rigid.

In accordance with yet another feature of the invention, the window guide profile section has a base, the sealing lip begins at the base and rests tightly against the window pane when the window is closed, and the window guide profile section has an upper shank onto which a triangular hollow profile section is extruded toward the roof.

In accordance with a concomitant feature of the invention, the window guide profile section has a lower shank with a lateral recess formed therein, the door frame has a sheet-metal flange extending parallel to the window pane, and there is provided a U-shaped sealing profile on the inside of the window pane being clamped or glued onto the flange, the U-shaped sealing profile having a laterally extruded-on hollow profile to be sealed against the closed window pane and an inner shank with a lengthwise extending projection being snapped or engaged into place in the lateral recess.

Furthermore, a second bearing stop for the window guide profile section itself is also provided because of this intermeshing of the shanks of the sealing profile in the window guide profile section.

Other features which are considered as characteristic for the invention are set forth in the appended claims.

Although the invention is illustrated and described herein as embodied in a configuration for retaining a window guide profile section, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, cross-sectional view of a door frame below a roof region, with profile sections mounted.

Referring now to the single FIGURE of the drawing in detail, there is seen a vehicle door having a box-like door frame 1 in an upper region thereof, onto which a U-shaped window guide profile section 2 or window running channel is slipped from the outside. The window guide profile section 2 seals off a window pane 4 at the bottom through a sealing lip 3 and seals it off from a lower edge 6 of a roof capping piece, through a hollow profile section 5 at the top. The window guide profile section 2 has a metal reinforcement 16.

The door frame 1 includes two metal panels 7 and 8 that are bent toward one another to make a box, and are joined at an inner end to make one common inner sheet metal flange 9. The two metal panels 7 and 8 do not form a closed frame, as in previously conventional structures, but instead leave a gap 10 remaining free on the top. This is accomplished by the fact that a horizontally extending end of the metal panel 8 ends some distance before the region of the metal panel 7 that is bent vertically upward, thus leaving the gap 10 which extends in the longitudinal direction of the door.

Depending on the location of this gap 10, an upper shank 11 of the window guide profile section 2 has a rib-like projection 12 on an inner surface thereof, with a front lateral surface or flank 13 extending vertically toward the shank 11 and an obliquely inclined rear lateral surface or flank 14.

If the window guide profile section 2 is slipped onto the door frame 1 from the front, which can be accomplished without exact centering, then the projection 12 will snap into the gap 10 between the two metal panels 7 and 8, and will be firmly locked against being pulled out at that location because its front lateral surface or edge 13 acts as a barb.

In order to make it easier to slip on the window guide profile section, the projection 12 can also have a hollow chamber 15, so that it can be slipped more easily over the front edge of the metal panel 7.

In the exemplary embodiment shown, a sealing profile 20 is additionally slipped onto the inner flange 9 of the door frame 1 with a U-shaped clamping region 21 thereof. Toward the window pane, this sealing profile 20 has an extruded-on hollow profile section 22, with which it provides a seal against the closed window pane 4. An inner shank 23 of this profile 20 also has a lengthening projection 24 on a free end thereof, which snaps into a corresponding recess 25 on a free end of a lower shank 26 of the window guide profile section 2. With this detent connection, the underside of the window guide profile section is additionally retained and prevented from shifting outward or being easily pulled out.

Due to the location and construction of the profile sections and the door frame as described above, it is accordingly possible to slip a corresponding window guide profile section without precise centering onto the door frame where it is then firmly locked, and even relatively large tolerances can be compensated for.

We claim:

1. In a motor vehicle having a roof, a door, and a window pane, an assembly comprising a box-like frame of the door, and a window guide profile section to be retained on said door frame, said door frame having a top with a longitudinally extending gap formed therein, and said window guide profile section having a sealing lip, an inner surface with a rib-like projection thereon, and a U-shaped cross section, said window guide profile section being slipped onto said door frame with said sealing lip protruding laterally toward the window pane and laterally toward the roof, and said projection snapping into said gap.

2. The assembly according to claim 1, wherein said projection has a vertical lateral surface facing toward the outside of the door for better fixation, and an obliquely inclined lateral surface facing toward the inside of the door for more easily slipping on said window guide profile section.

3. The assembly according to claim 2, wherein said projection has a base with a given width, and said gap is wider than said given width.

4. The assembly according to claim 2, wherein said projection has a hollow chamber formed therein.

5. The assembly according to claim 1, wherein said window guide profile section has a metal reinforcement.

6. The assembly according to claim 5, wherein said window guide profile section has a base, said sealing lip begins at said base and rests tightly against the window pane when the window is closed, and said window guide profile section has an upper shank onto which is extruded a triangular hollow profile section extending toward the roof.

7. The assembly according to claim 1, wherein said window guide profile section has a lower shank with a lateral recess formed therein, the door frame has a sheet-metal flange extending parallel to the window pane, and including a U-shaped sealing profile on the inside of the window pane being clamped onto said flange, said U-shaped sealing profile having a laterally extruded-on hollow profile to be sealed against the closed window pane and an inner shank with an extending projection being snapped into place in said lateral recess.

8. The assembly according to claim 1, wherein the roof has a sleeper toward which said sealing lip protrudes.

* * * * *